(12) United States Patent
Ferrer Beltran

(10) Patent No.: US 6,431,520 B1
(45) Date of Patent: *Aug. 13, 2002

(54) SAFETY VALVE FOR FLUIDS

(75) Inventor: Jose María Ferrer Beltran, Foyos (ES)

(73) Assignee: Valvulas Arco. S.A. (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,475

(22) Filed: May 17, 1999

(51) Int. Cl.⁷ ................................................. F16K 5/06
(52) U.S. Cl. ..................................... 251/288; 251/315.1
(58) Field of Search .................... 251/315.01, 315.1, 251/288, 214; 29/511

(56) References Cited

U.S. PATENT DOCUMENTS

| | | | | |
|---|---|---|---|---|
| 2,919,886 A | * | 1/1960 | Hurst | 251/315.1 |
| 3,096,966 A | * | 7/1963 | McFarland, Jr. | 251/214 |
| 3,584,833 A | * | 6/1971 | Grenier | 251/315.14 |
| 4,177,972 A | * | 12/1979 | Legris | 251/288 |
| 4,345,738 A | * | 8/1982 | Ripert | 251/315.01 |
| 4,753,418 A | * | 6/1988 | Brotcke | 251/288 |
| 4,936,545 A | * | 6/1990 | Ferrero | 251/288 |
| 5,010,917 A | * | 4/1991 | Iqbal | 251/288 |
| 5,042,529 A | * | 8/1991 | Yeh | 251/214 X |
| 5,263,685 A | * | 11/1993 | Winnike et al. | 251/315.01 |
| 5,577,709 A | * | 11/1996 | Gugula et al. | 251/288 |
| 5,628,493 A | * | 5/1997 | McKnight et al. | 251/288 |
| 5,735,307 A | * | 4/1998 | Charron | 251/288 |

* cited by examiner

*Primary Examiner*—Lesley D. Morris
*Assistant Examiner*—Eric Keasel
(74) *Attorney, Agent, or Firm*—Lackenbach Siegel LLP

(57) ABSTRACT

The safety valve for fluids subject of this Patent is a spherical valve for a straight or right-angle (90°) flow and a quarter-turn. Its structure comprises: a box (1) having a small central cylindrical recess (2) on its bottom, and two diametrically opposed notches (6) in its neck (5). A spherical body (4) provided with two throats (8) on its driving shaft (7) and a central cylindrical projection (3) on the bottom end of the axis of longitudinal symmetry. An intermediate tube-shaped part (10) between the shaft (7) of the body (4) and the neck (5) on the box (1), provided with two peripheral throats (11). A washer (13) provided with two diametrically opposed radial projections (14). A manual control (15) provided with two diametrically opposed dissymmetrical projections (16)–(17). The sealing means are: two O-ring seals (9) on the driving shaft (7) and a further two (12) on the intermediate part. Two annular elastic seals (18) between the box (1) passages and the spherical body (4). A rim (19) provided by drawing in the top edge of the neck (5) after fitting the washer (13) in its housing, thereby to ensure that it is locked therein, that the valve is sealed and that it is altogether inviolable and even tamper-resistant, and therefore that the valve is safe against deflagration or explosion.

3 Claims, 10 Drawing Sheets

SAFETY VALVE FOR FLUIDS

BACKGROUND OF THE INVENTION

The use of combustible (natural, town, butane) gas flow, control or cut-off valves both in mains and in branches thereof for supplying certain appliances (kitchen, heaters, etc.) consuming the same is known and commonly applied.

In any event, the operating means must primarily meet certain safety requirements, particularly making the mobility of flow control members compatible with the valve being altogether sealed in order to prevent potential gas leaks resulting in deflagration or explosion of gas building up therein.

SUMMARY OF THE INVENTION

The purpose of the invention constituting the object of this Patent is to enhance the sealing of known valves for controlling the flow in combustible gas lines, ensuring that they are compatible with the required mobility of the control members.

The valve is of the so-called spherical kind, with a straight or right-angle (90°) fluid flow and with a full to no flow control by means of a quarter-turn of the turning control.

Its structure comprises the following elements:

A box having a small central cylindrical recess in its bottom inner face for snugly housing a similarly shaped projection existing on the bottom of the valve body, and provided on its neck or top portion with two identical and diametrically opposed notches in the direction of the longitudinal axis, designed to snugly house two diametric projections from the washer limiting the turn of the control to a quarter turn, in order to lock the same.

A straight or right-angle flow spherical valve body provided on its driving shaft with two O-ring seals and centrally at the bottom end of its axis of longitudinal symmetry, with a cylindrical projection which is snugly housed in the respective recess on the box bottom and serves as a mounting guide and a socket for a rotary connection.

An intermediate cylindrical tube-shaped adjusting part between the shaft driving the valve body and the box neck, provided with two peripheral throats on the side surface, each one for housing an O-ring seal.

A washer limiting the turn of the control to a quarter turn, provided with two diametrically opposed radial projections housed within the notches in the valve neck, to lock the washer.

A top control, conventionally connected to the valve body shaft, with two diametrically opposed dissymmetrical projections, one being wider and shorter for ease of turning drive pressure and the other one being narrower and longer for a better grip.

The means designed to ensure sealing of the valve are the following:

Two O-ring seals each inserted in a peripheral throat on the valve body shaft.

Two O-ring seals each inserted in a peripheral throat on the side surface of the intermediate adjusting part.

Two annular elastic seals arranged between the flow passages in the valve box and the surface of the spherical body.

An inwardly directed top rim on the neck of the box is also provided after fitting the washer for limiting rotation in its housing. The mechanical step to draw in the edge of the neck can be made because the depth of its notches is greater than the thickness of the washer, which is thus retained in its seat by the rim provided, without being able to come loose even if the internal valve pressure rises, thereby not only ensuring that the valve is sealed but moreover that it is altogether inviolable and even tamper-resistant, and therefore that the valve is safe against deflagration or explosion.

BRIEF DESCRIPTION OF THE DRAWINGS

Drawings are attached for a fuller description of the invention and an easier understanding of its formal, structural and functional characteristics and its object, schematically showing various features of a preferred embodiment of the safety valve for fluids subject of this Patent.

In said drawings, FIG. 17' shows a right-angled valve (90° flow); and the remaining figures show elements valid for both valves.

Figure 1:
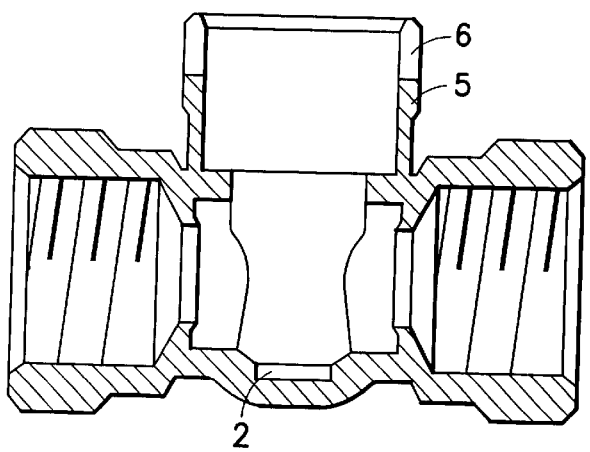
FIGS. 1, 2, 3, 5, 6, 7, 8, 9, 10, 17, 18 and 19 show a straight flow valve.
Figure 2:
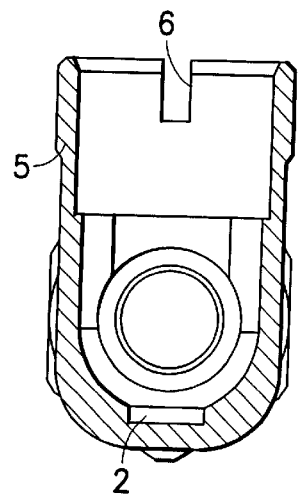
Figure 3:
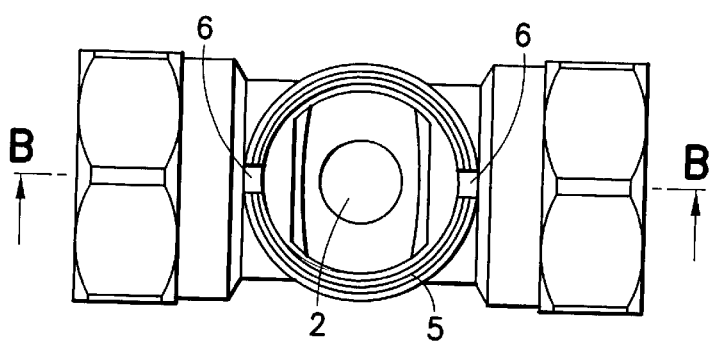
Figure 4:
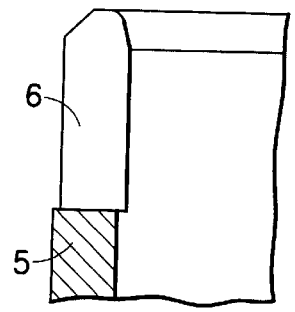
Figure 5:
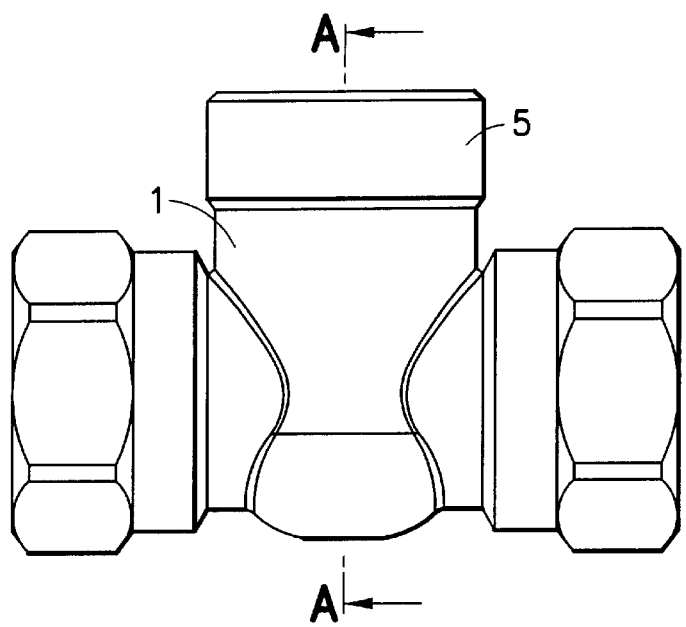
Figure 6:
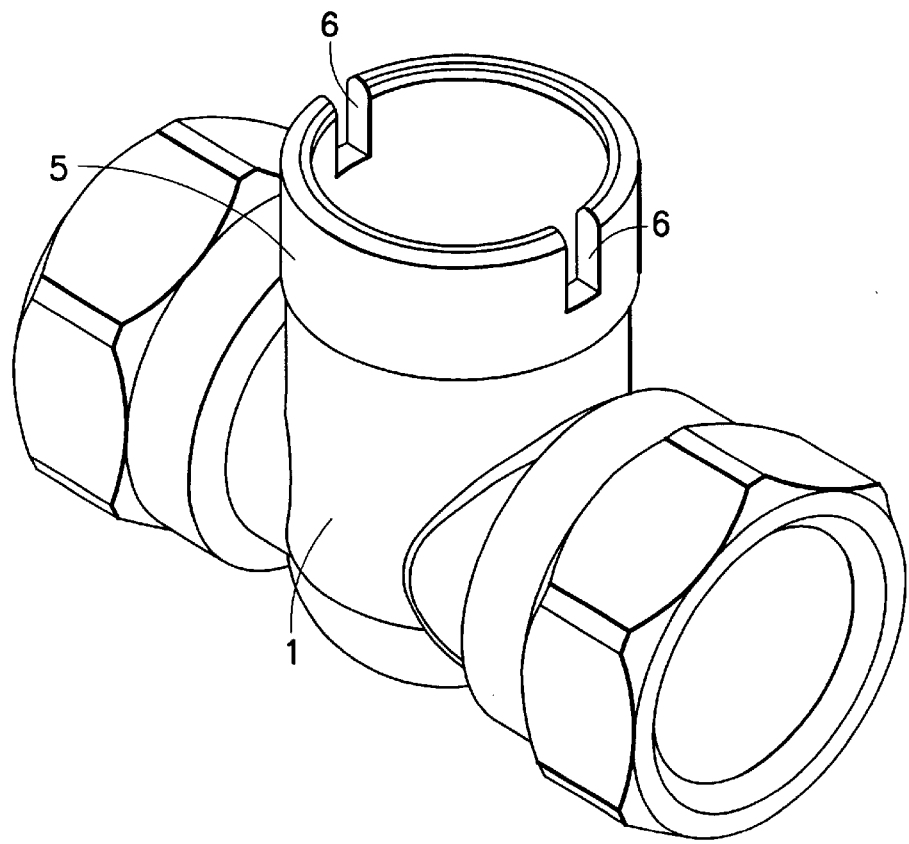

The following is specifically shown:

FIGS. 1 to 6 show several views of the valve box: FIG. 1 is a longitudinal section thereof along line B—B of FIG. 3; FIG. 2 is a cross-section along line A—A of FIG. 5; FIG. 3 is a plan view; FIG. 4 is an enlarged detail of the profile of the top edge of the neck, before it is drawn in to retain the washer; FIG. 5 is a side elevation; and FIG. 6 is. a perspective.

Figure 7:
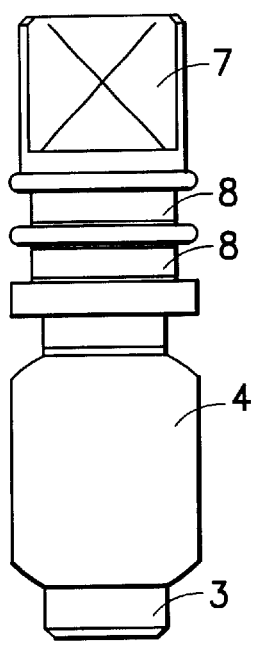
Figure 8:
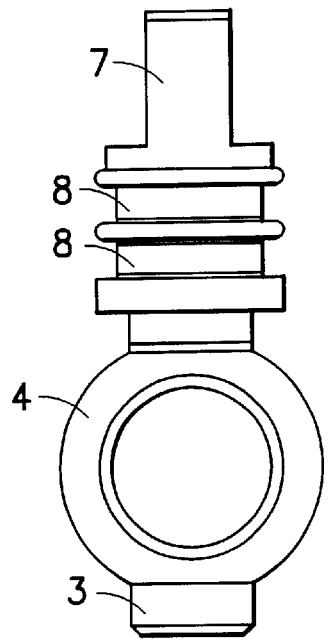
Figure 9:
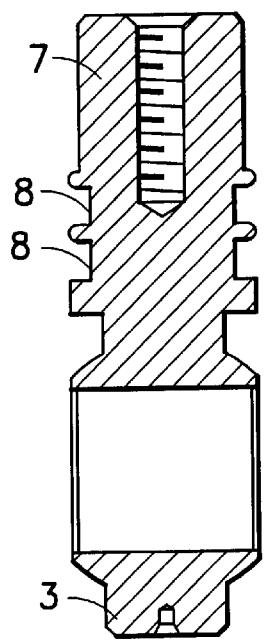
Figure 10:
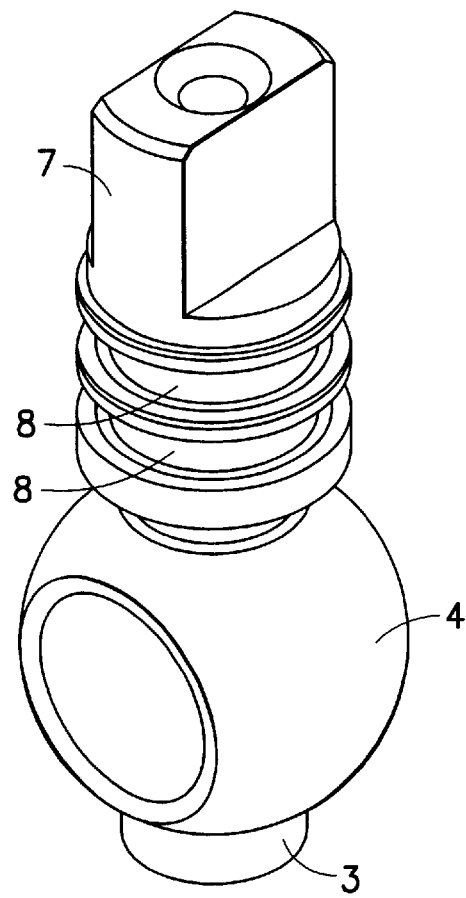

FIGS. 7 to 10 show several views of the spherical valve body: FIG. 7 is a side elevation; FIG. 8 is a front elevation; FIG. 9 is a section along a diametrical plane, in the longitudinal direction of the straight flow opening; and FIG. 10 is a perspective.

Figure 11:
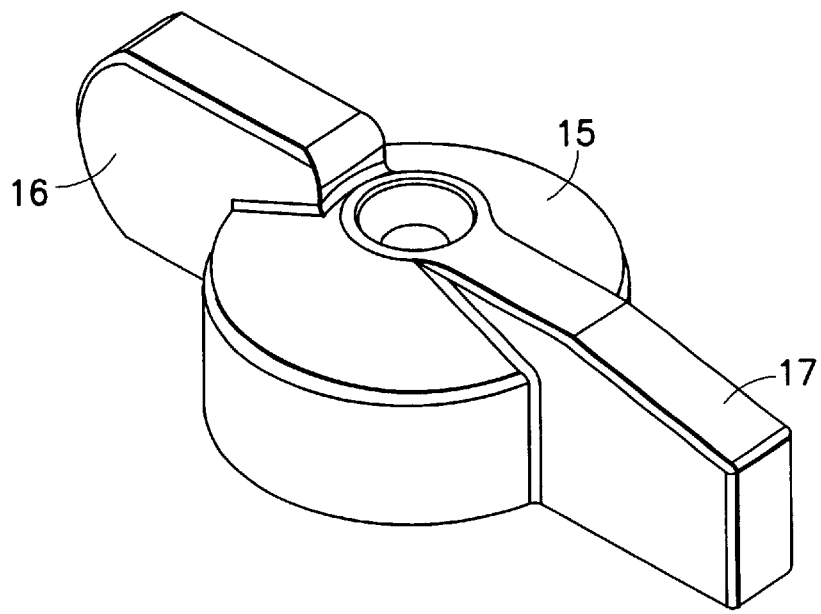
Figure 12:
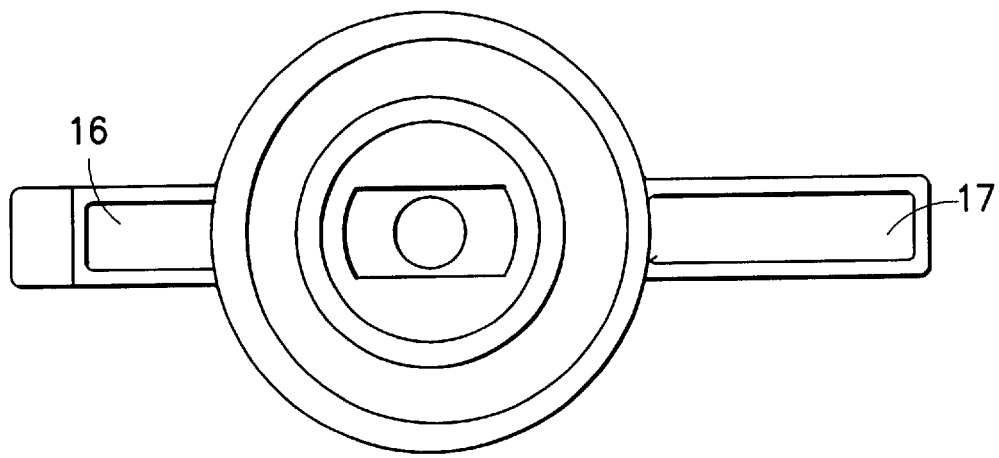
Figure 13:
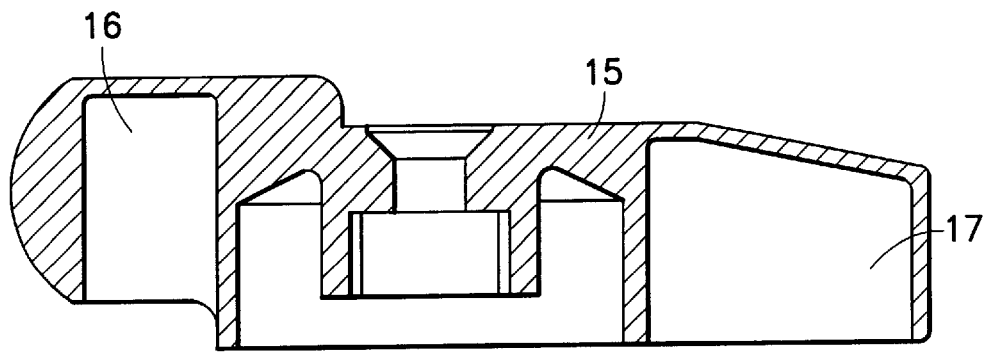
Figure 14:
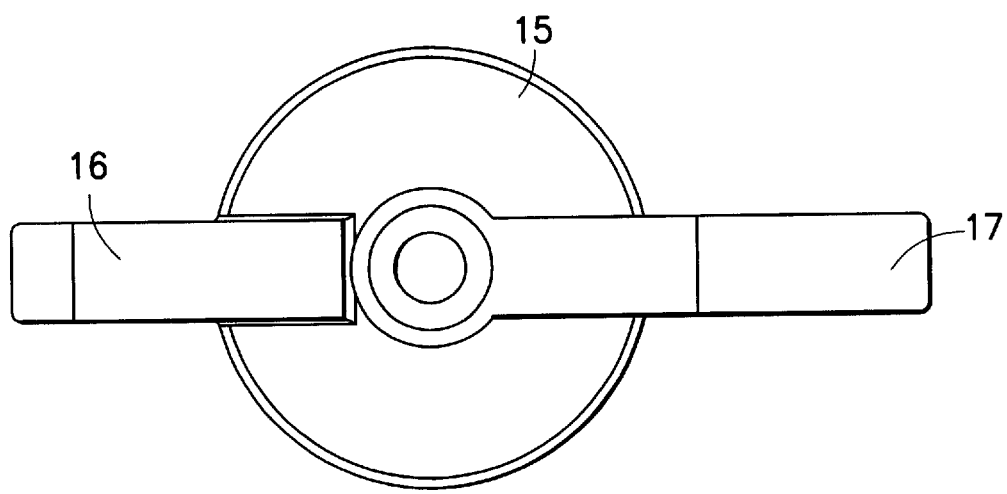

FIGS. 11 to 14 show several views of the top manual control: FIG. 11 is a perspective; FIG. 12 is a lower plan; FIG. 13 is a section along a longitudinal plane in the direction of two drive projections; and FIG. 14 is a top plan view.

Figure 15:
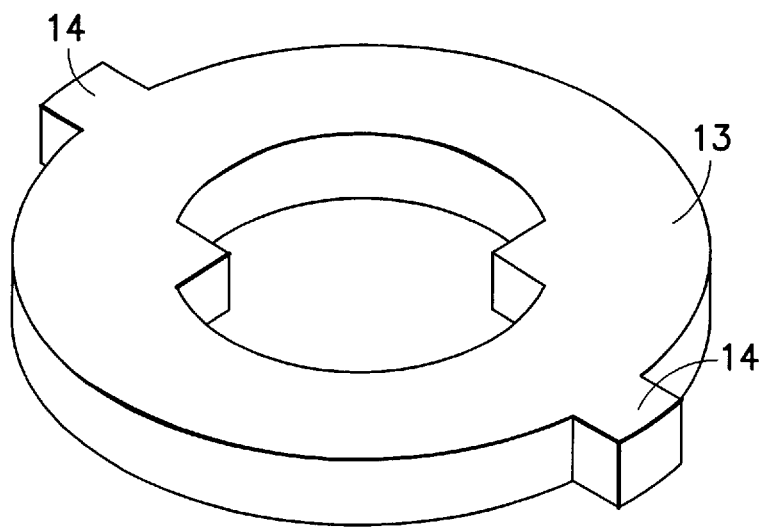
Figure 16:
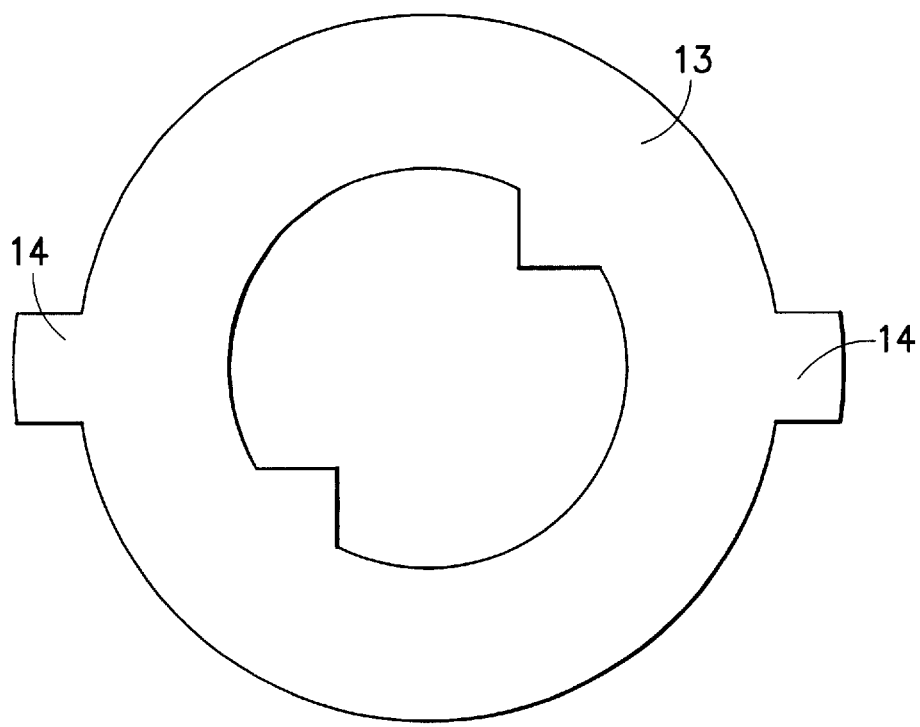

FIGS. 15 and 16 show the washer limiting the turning of the control to a quarter turn: FIG. 15 is a perspective and FIG. 16 a plan.

Figure 17:
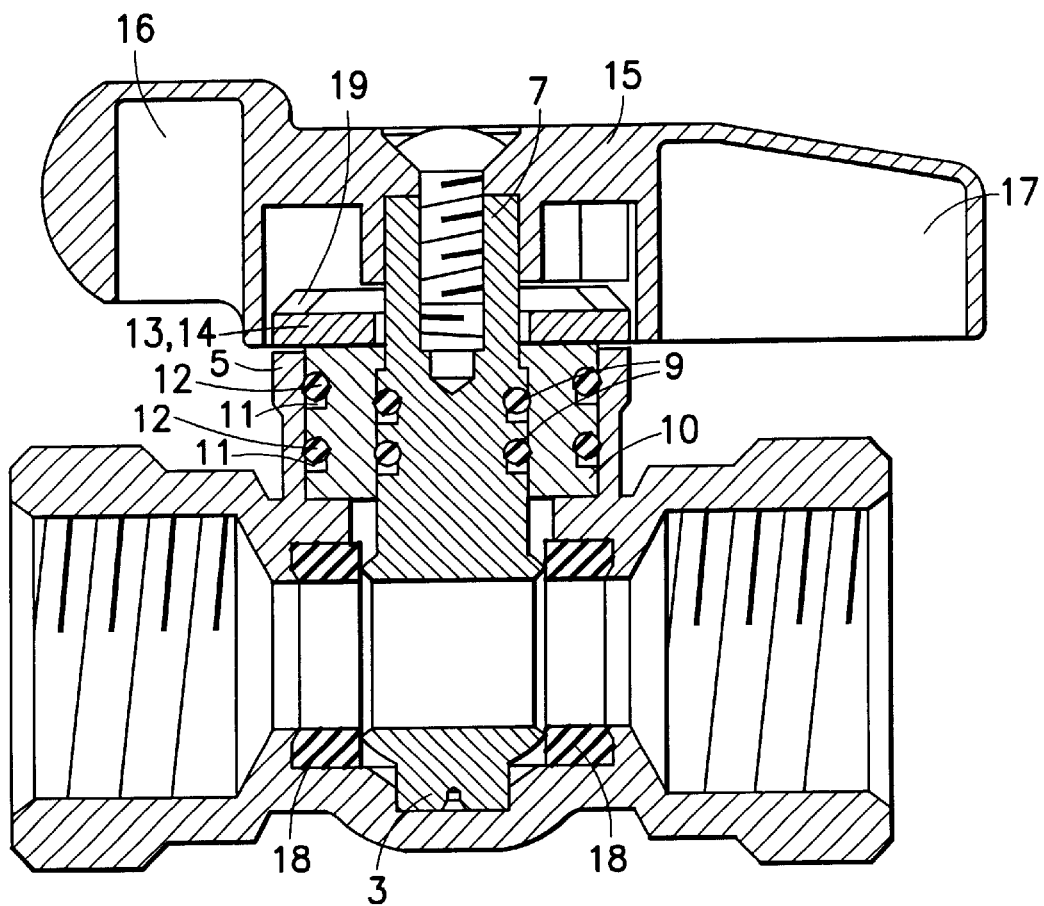
Figure 17:
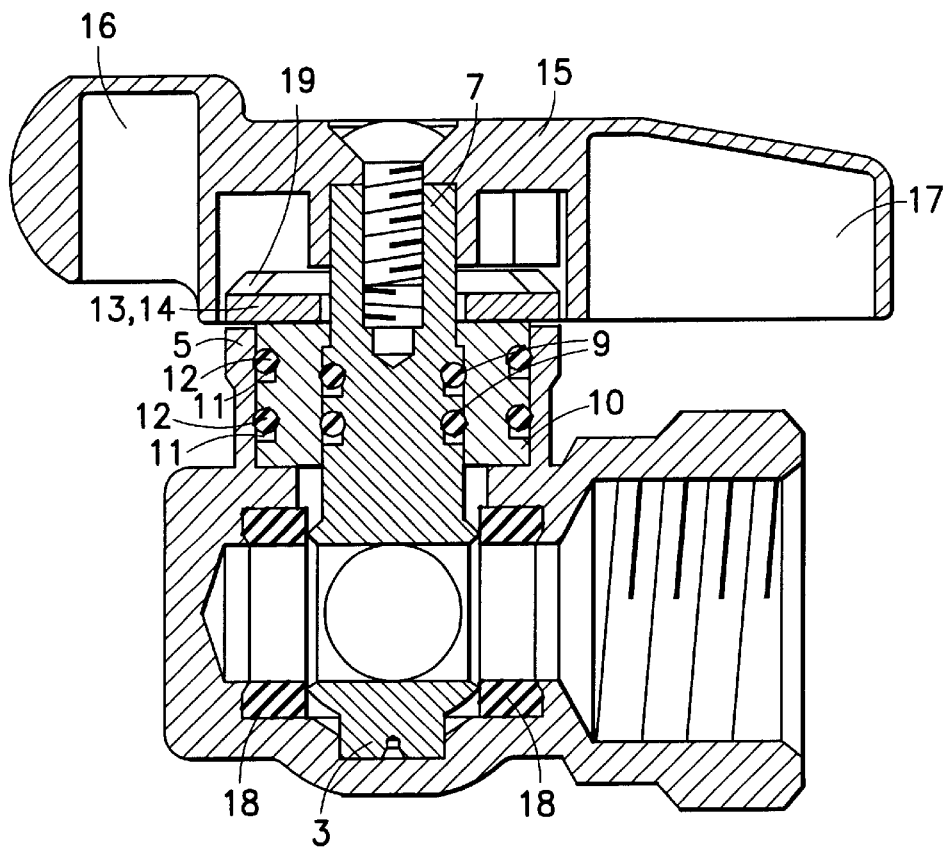
Figure 18:
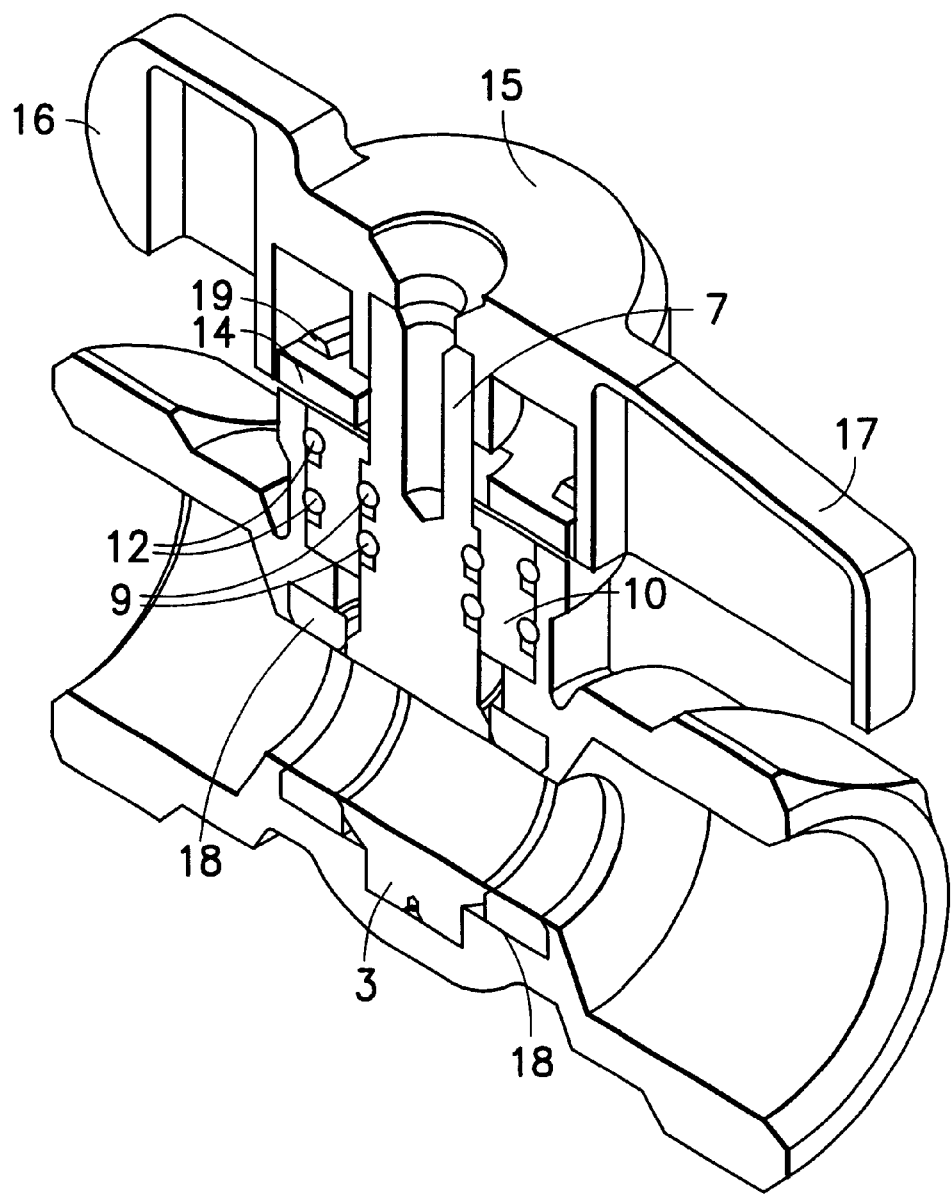

FIGS. 17 and 18 show a same longitudinal section of the mounted straight flow valve: FIG. 17 is a front projection and FIG. 18 a perspective. FIG. 17' is a longitudinal section of the right-angle valve.

Figure 19:
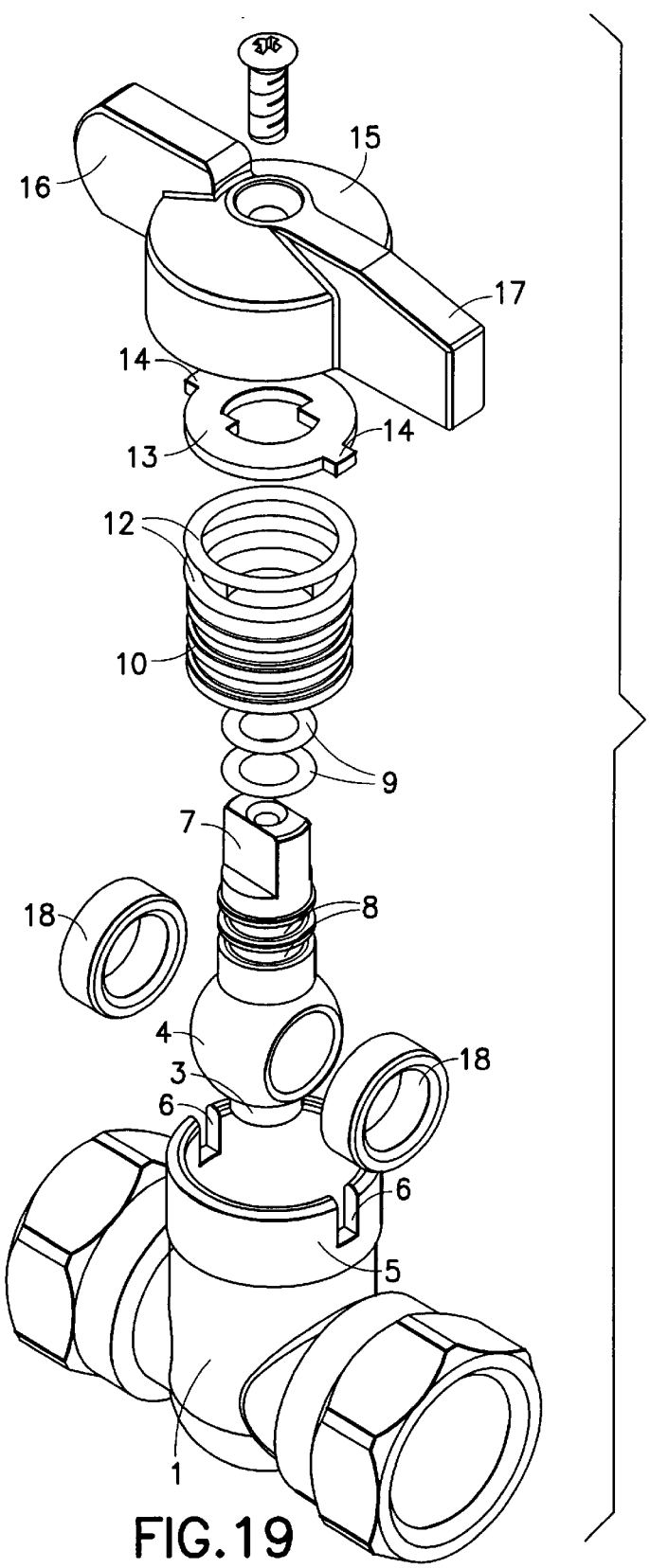

FIG. 19 is an exploded view of the structural valve components.

DETAILED DESCRIPTION OF THE INVENTION

The construction and mounting of the safety valve for fluids constituting the object of the invention is described hereinafter in order to clearly show the nature and scope of its advantageous application with reference to the drawings which show a preferred embodiment of said object of the invention for informative purposes and same should therefore be considered in the broadest sense and not to limit the application and contents of the invention.

The safety valve for fluids protected in this Patent is of the so-called "spherical" kind, with a straight or right-angle (90°) fluid flow and a quarter-turn control.

Its structure comprises:

A box (1) having a small central cylindrical recess (2) in its bottom inner face, snugly housing a similarly shaped projection (3) existing on the bottom of the spherical body (4), whereas its neck (5) is provided with two identical longitudinal notches (6) lying at the ends of a diameter parallel to the axis of the fluid flow duct, their depth being greater than the thickness of the washer (13).

A straight or right-angle (90°) flow spherical valve body (4) provided on its driving shaft (7) with two peripheral throats (8), each one to house an O-ring seal (9), whereas the bottom end of its axis of longitudinal symmetry is provided with a cylindrical projection (3).

An intermediate cylindrical tube-shaped adjusting part (10) between the shaft (7) driving the body (4) and the neck (5) on the box (1), provided with two peripheral throats (11), each one to house an O-ring seal (12).

A washer (13) limiting the turn of the control, provided with two diametrically opposed radial projections (14) housed within the notches (6) in the valve neck (5).

A manual control (15) provided with two diametrically opposed dissymmetrical projections, one (16) being wider and shorter and the other one (17) being narrower and longer.

The means designed to ensure sealing of the valve in addition to the O-ring seals (9) and (12) are the following:

Two annular elastic seals (18) arranged between the flow passages in the box (1) and the surface of the spherical body (4).

A rim (19) on the neck (5) of the box (1) provided by drawing in its top edge after fitting the washer (13) in its housing, thereby for it to be retained therein even if the internal valve pressure rises.

This arrangement not only ensures that the valve is sealed but moreover that it is altogether inviolable and even tamper-resistant, and therefore that the valve is safe against deflagration or explosion.

I claim:

1. A safety valve for fluids comprising:

a box (1) and a ball element operably disposed in said box, said box having an upper neck section (5), said upper neck section (5) being formed with a rim (19) and extends upwardly from said box (1), said box, upper neck section and rim being of one piece construction, said upper neck section (5) having notches (6) extending downwardly from the rim (19), a stop washer (13) limiting the turning of the ball element, said washer having a peripheral portion and flanges extending radially outwardly from said peripheral portion, said flanges being fixedly disposed in said notches (6) by said rim (19) being inwardly disposed in clinched engagement with said washer (13) peripheral portion.

2. The safety valve of claim 1, said rim being formed at the top end of the upper neck section.

3. The safety valve of claim 1, said rim and washer being in contacting clinched engagement.

* * * * *